United States Patent
Zhong

(10) Patent No.: US 11,202,066 B2
(45) Date of Patent: Dec. 14, 2021

(54) VIDEO DATA ENCODING AND DECODING METHOD, DEVICE, AND SYSTEM, AND STORAGE MEDIUM

(71) Applicant: TENCENT TECHNOLOGY (SHENZHEN) COMPANY LIMITED, Shenzhen (CN)

(72) Inventor: Yu Zhong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 64 days.

(21) Appl. No.: 16/244,986

(22) Filed: Jan. 10, 2019

(65) Prior Publication Data

US 2019/0149818 A1    May 16, 2019

Related U.S. Application Data

(63) Continuation of application No. PCT/CN2017/095607, filed on Aug. 2, 2017.

(30) Foreign Application Priority Data

Aug. 25, 2016   (CN) .......................... 201610717089.2

(51) Int. Cl.
*H04N 19/114*   (2014.01)
*H04N 19/159*   (2014.01)
(Continued)

(52) U.S. Cl.
CPC ......... *H04N 19/114* (2014.11); *H04N 19/107* (2014.11); *H04N 19/159* (2014.11);
(Continued)

(58) Field of Classification Search
CPC .. H04N 19/114; H04N 19/107; H04N 19/164; H04N 19/172; H04N 19/159; H04N 19/503
See application file for complete search history.

(56) References Cited

U.S. PATENT DOCUMENTS 6,163,573 A * 12/2000 Mihara ................ H04N 19/177
                                                    375/240.02
10,425,661 B2 * 9/2019 Stepin ..................... H04N 19/65
(Continued)

FOREIGN PATENT DOCUMENTS

CN          101330619 A        12/2008
CN          103152576 A *       6/2013
(Continued)

OTHER PUBLICATIONS

Optimization Practice of QQ Live Broadcast from 2016-06-28. This NPL was cited in Applicant's IDS dated Jan. 10, 2019. (Year: 2016 ).*
(Continued)

*Primary Examiner* — Richard A Hansell, Jr.
(74) *Attorney, Agent, or Firm* — Anova Law Group, PLLC

(57) ABSTRACT

A video data encoding method is provided for an encoding device. The method includes obtaining first video data, and encoding the first video data to generate a plurality of sequentially arranged groups-of-pictures. A frame type of a first frame of an initial group-of-pictures in the plurality of groups-of-pictures is an I frame, frame types of first frames of the other groups-of-pictures are GF frames, and each GF frame is configured to record change information of a current frame of a corresponding group-of-pictures relative to an I frame or a GF frame in a previous group-of-pictures. The method also includes successively outputting the plu-
(Continued)

rality of groups-of-pictures according to a sequence of the plurality of groups-of-pictures, to obtain second video data.

12 Claims, 6 Drawing Sheets

(51) Int. Cl.
*H04N 19/107* (2014.01)
*H04N 19/164* (2014.01)
*H04N 19/503* (2014.01)
*H04N 19/172* (2014.01)

(52) U.S. Cl.
CPC ......... *H04N 19/164* (2014.11); *H04N 19/172* (2014.11); *H04N 19/503* (2014.11)

(56) References Cited

U.S. PATENT DOCUMENTS

| | | | |
|---|---|---|---|
| 2009/0135901 A1 | 5/2009 | Au et al. | |
| 2012/0320966 A1* | 12/2012 | Guo | H04N 21/44008 375/240.02 |
| 2014/0321556 A1* | 10/2014 | Xiao | H04N 19/115 375/240.26 |
| 2016/0037170 A1* | 2/2016 | Zhang | H04N 19/58 375/240.12 |
| 2019/0132592 A1* | 5/2019 | Liu | H04N 19/139 |

FOREIGN PATENT DOCUMENTS

| | | | | |
|---|---|---|---|---|
| CN | 103918258 A | | 7/2014 | |
| CN | 106254869 A | | 12/2016 | |
| EP | 3013050 A1 | * | 4/2016 | ........... H04N 19/136 |
| JP | 2009194591 A | * | 8/2009 | |

OTHER PUBLICATIONS

Optimization Practice of QQ Live Broadcast from Jun. 28, 2016.*
The World Intellectual Property Organization (WIPO) International Search Report for PCT/CN2017/095607 dated Nov. 8, 2017 5 Pages (including translation).
Anonymity, "Optimization Practice of QQ Live Broadcast", https://m.2cto.com/kf/201606/520741.html, Jun. 28, 2016 (Jun. 28, 2016), the main body, pp. 6-7 29 Pages (including translation).

* cited by examiner

VIDEO DATA ENCODING AND DECODING METHOD, DEVICE, AND SYSTEM, AND STORAGE MEDIUM

RELATED APPLICATIONS

This application a continuation application of PCT Patent Application No. PCT/CN2017/095607, filed on Aug. 2, 2017, which claims priority to Chinese Patent Application 201610717089.2, filed with the Chinese Patent Office on Aug. 25, 2016 and entitled "VIDEO DATA ENCODING AND DECODING METHOD, DEVICE, AND SYSTEM", content of all of which is incorporated herein by reference in its entirety.

FIELD OF TECHNOLOGY

This application relates to the field of communications technologies and, in particular, to a video data encoding and decoding method, device, and system, and a storage medium.

BACKGROUND

At present, video has become an important carrier of recreation, entertainment, and communication of people. To facilitate storage and transmission of video content, usually the size of the video content needs to be reduced. That is, original content elements (that is, an original picture or an audio) of a video need to be compressed. Such technology is referred to as video encoding. Corresponding to the video encoding, when the video needs to be played, the encoded video also needs to be decoded correspondingly, so as to read the video image, and render and display the image.

However, the current encoding methods often are inefficient for storage and transmission. The disclosed methods and systems are directed to solve one or more problems set forth above and other problems.

SUMMARY

An embodiment of the present disclosure provides a video data encoding method for an encoding device. The method includes obtaining first video data, and encoding the first video data to generate a plurality of sequentially arranged groups-of-pictures. A frame type of a first frame of an initial group-of-pictures in the plurality of groups-of-pictures is an I frame, frame types of first frames of the other groups-of-pictures are GF frames, and each GF frame is configured to record change information of a current frame of a corresponding group-of-pictures relative to an I frame or a GF frame in a previous group-of-pictures. The method also includes successively outputting the plurality of groups-of-pictures according to a sequence of the plurality of groups-of-pictures, to obtain second video data.

An embodiment of the present disclosure further provides a video data decoding method for a decoding device. The method includes obtaining encoded video data, the encoded video data comprising a plurality of groups-of-pictures. A frame type of a first frame of an initial group-of-pictures in the plurality of groups-of-pictures is an I frame, frame types of first frames of the other groups-of-pictures are GF frames, and a GF frame is configured to record change information of a current frame relative to an I frame or a GF frame in a previous group-of-pictures; successively decoding the plurality of groups-of-pictures in the encoded video data, to obtain original video data; and outputting the original video data An embodiment of the present disclosure further provides a video data encoding method for an encoding device. The method includes obtaining original video data, and encoding the original video data to generate a plurality of sequentially arranged groups-of-pictures. A frame type of any non-first frame in the plurality of groups-of-pictures is a special P frame or an enhanced P frame, the special P frame is configured to record change information of a current frame relative to an I frame, a GF frame, a P frame, or a special P frame previous to the current frame in this group-of-pictures, and the enhanced P frame is configured to record change information of the current frame relative to a previous frame adjacent to the current frame or the I frame, the GF frame, the P frame, the special P frame, or an enhanced P frame previous to the current frame in a corresponding group-of-pictures. The method also includes successively outputting the plurality of groups-of-pictures according to a sequence of the plurality of groups-of-pictures, to obtain encoded video data.

An embodiment of the present disclosure further provides a video data encoding apparatus. The apparatus includes a memory and a processor coupled to the memory. The processor is configured to perform: obtaining first video data, and encoding the first video data to generate a plurality of sequentially arranged groups-of-pictures. A frame type of a first frame of an initial group-of-pictures in the plurality of groups-of-pictures is an I frame, frame types of first frames of the other groups-of-pictures are GF frames, and each GF frame is configured to record change information of a current frame of a corresponding group-of-pictures relative to an I frame or a GF frame in a previous group-of-pictures. The processor is also configured to perform: successively outputting the plurality of groups-of-pictures according to a sequence of the plurality of groups-of-pictures, to obtain second video data.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of the present disclosure more clearly, the following briefly introduces the accompanying drawings for describing the embodiments. Apparently, the accompanying drawings show merely some embodiments of the present disclosure, and a person of ordinary skill in the art may derive other drawings from these accompanying drawings without creative efforts.

DETAILED DESCRIPTION

The following describes the technical solutions in the embodiments of the present disclosure with reference to the accompanying drawings. Apparently, the described embodiments merely are some but not all of the embodiments of the present disclosure. Other embodiments obtained by a person skilled in the art based on the embodiments of the present disclosure without creative efforts shall fall within the protection scope of the present disclosure.

In some embodiments, to facilitate decoding and improve the decoding efficiency, a decoder may generate segments of groups of pictures (GOP) after encoding a plurality of original pictures. In this way, the segments of GOPs may be read individually during playing of the decoder, so as to be decoded, without needing to be decoded after all encoded data is read. That is, the GOP is a basic unit accessed by a video encoder and a decoder. Generally, a GOP may be composed of an I (Intra-Prediction) frame and a plurality of B/P frames. The I frame is an intra-coded frame, is a first frame of each GOP, and is an entire image. The P frame (predictive-frame) is a forward prediction frame, and records changes relative to an adjacent previous I frame or P frame in this GOP. That is, the P frame successively refers to adjacent previous frames. The B frame (bi-directional interpolated prediction frame) is a bi-directional interpolated frame, and differs from the P frame in that the B frame may refer to an I frame or an adjacent previous P frame in this GOP, and may also refer to a next adjacent P frame. That is, the B frame records changes between adjacent previous and next frames. However, the B frame is not a reference frame, and cannot be referred to.

However, under a normal or a relatively low network speed, the packet-loss resistance of the above encoding methods is relatively weak. First, the frame type of the first frame of each GOP is the I frame, and the size of the I frame is relatively large, so that packet loss easily occurs in video data containing a plurality of GOPs. Moreover, downloading and decoding of subsequent GOPs is relatively slow, finally resulting in unsmooth play. In addition, if an I frame or a P frame is lost, decoding of subsequent P frames in the GOP will fail, resulting in the problem of delaying playback or frame freezing.

To resolve the foregoing technical problems, the present disclosure provides a video data encoding and decoding method, device, and system. In the present disclosure, for ease of description, un-encoded video data or video data obtained by decoding (also referred to as original video data) may be referred to as first video data; and encoded video data performed with encoding or encoded video data without being decoded (also referred to as encoded video data) is referred to as second video data.

Figure 1A:
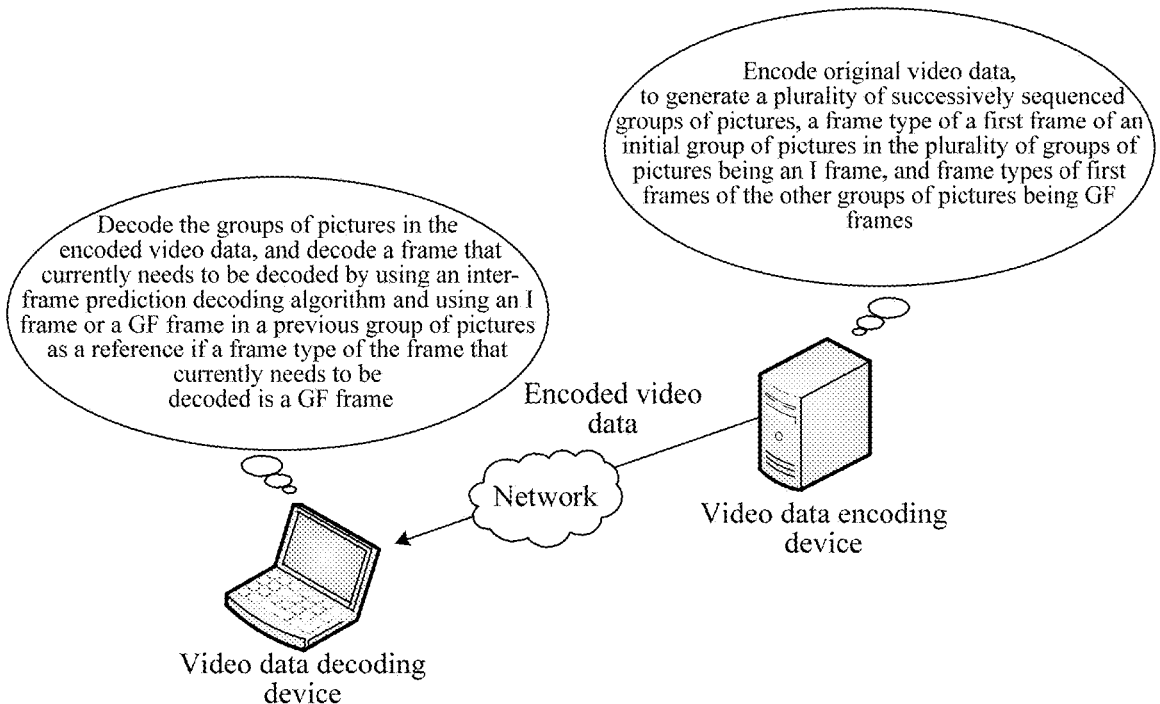
FIG. 1A is a schematic scenario diagram of a video data processing system according to an embodiment of the present disclosure.

Refer to FIG. 1A, the video data processing system may include a video data encoding device and a video data decoding device. The video data encoding device may obtain original video data; encode the original video data to generate a plurality of continuously sequenced GOPs; and then successively output the plurality of GOPs according to the sequence, to obtain encoded video data.

The frame type of a first frame of an initial GOP in the plurality of GOPs is an I frame, the frame type of first frames of the other GOPs is a GF frame, and the GF frame may be configured to record change information of a current frame relative to an I frame or a GF frame in a previous GOP. In this way, after obtaining the encoded video data, the video data decoding device may successively decode the GOPs in the encoded video data.

For example, if a frame type of a frame that currently needs to be decoded is an I frame, the frame that currently needs to be decoded is decoded by using an intra-frame prediction encoding algorithm. However, if the frame type of the frame that currently needs to be decoded is a GF frame, the frame that currently needs to be decoded is decoded by using an inter-frame prediction decoding algorithm and using an I frame or a GF frame in a previous GOP as a reference. Because the GF frame refers to the I frame or the GF frame in a previous GOP, although a frame in the GOP is lost, other frames in the GOP would not be affected. In addition, because the size of the GF frame is smaller than that of the I frame, downloading and decoding of a subsequent GOP is quicker, and even the video data can be quickly downloaded under a low network speed, so as to smoothly present the video data. Therefore, packet-loss resistance may be significantly improved. Detailed descriptions are respectively provided in the following by using specific embodiments.

In one embodiment, a video data encoding method is provided, and description is made from a perspective of a video data encoding device. The video data encoding device may be specifically integrated into a device such as a server or a terminal.

The video data encoding method includes: obtaining original video data; encoding the original video data to generate a plurality of sequentially arranged GOPs; and successively outputting the plurality of GOPs according to the sequence to obtain encoded video data. A frame type of a first frame of an initial GOP in the plurality of GOPs is an I frame, and frame types of first frames of the other GOPs are GF frames. The GF frame is configured to record change information of a current frame relative to an I frame or a GF frame in a previous GOP.

Figure 1B:
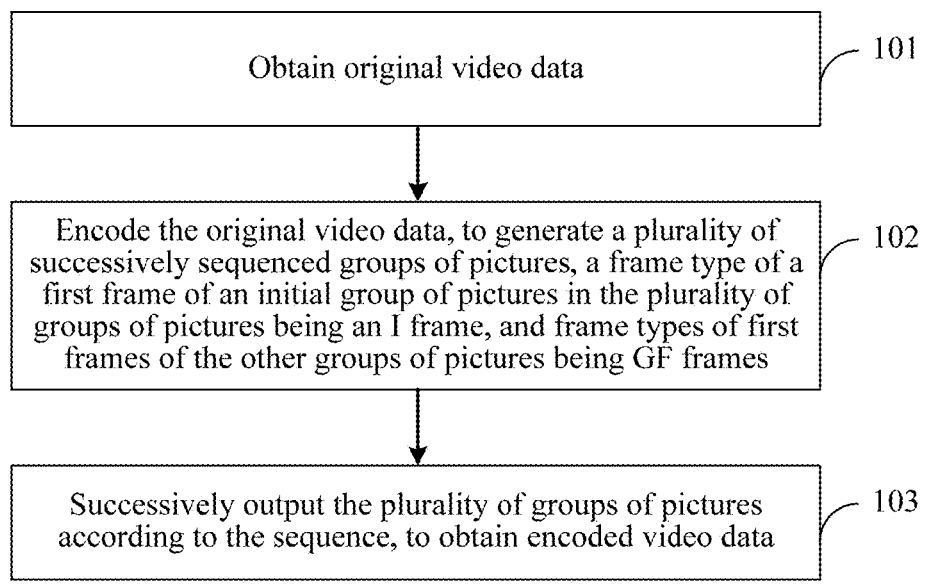
FIG. 1B is a flowchart of a video data encoding method according to an embodiment of the present disclosure.

As shown in FIG. 1B, a specific process of the video data encoding method may include the followings.

101. Obtaining original video data.

For example, the original video data specifically may be obtained locally, or may be obtained from another device.

The original video data may include original audio data and original picture data. The original picture data may include a plurality of original pictures.

102. Encoding the original video data to generate a plurality of sequentially arranged GOPs, where a frame type of a first frame of an initial GOP in the plurality of GOPs being an I frame, and frame types of first frames of the other GOPs being GF frames.

The I frame refers to an intra-prediction frame, does not rely on other frames while being decoded, is an entry point for random access, and is also a reference frame for decoding. That is, the I frame only searches in the current frame when searching for a reference block. For example, if a frame type of a frame "A" is an I frame, the reference block is searched for only in the fame "A" when the fame "A" is being decoded. The I frame is mainly configured to initialize a receiver, obtain a channel, and switch and insert a program. A compression multiple of an I-frame picture is relatively small.

On the other hand, the GF frame is mainly configured to record change information of the current frame relative to the I frame or the GF frame in a previous GOP. The GF frame essentially is a frame of a P frame type. That is, the GF frame may search in the I frame or the GF frame in the previous GOP when searching for a reference block. For example, if a frame type of a frame "B" is "GF", the I frame or the GF frame in the previous GOP may be used as a reference when the fame "B" is being decoded. In some embodiments of the present disclosure, to avoid a decoding error of a subsequent GF frame due to a decoding error of a GF frame, the I-frame picture may periodically occur in the sequence of the GOPs, and an occurrence frequency of the I-frame picture may be selected by an encoder.

In an embodiment of the present disclosure, the process of "encoding the original video data to generate a plurality of sequentially arranged GOPs" may be as follows.

(1) Obtaining encoding rule information, where the encoding rule information may include information such as the length of the GOP and an encoding format.

The length of the GOP may be described as that the I frame or the GF frame occurs once every how many frames, and is usually recorded as N. The encoding format may include information such as an intra-frame prediction encoding algorithm and an inter-frame prediction encoding algorithm.

(2) Obtaining a corresponding number of original pictures from the original video data according to the length of the GOP.

(3) Encoding the original pictures according to the encoding format, to generate a GOP, and performing step (2), i.e., performing the process of obtaining a corresponding number of original pictures from the original video data according to the length of the GOP, until all original pictures in the original video data have been encoded.

For example, using that the encoding format includes the intra-frame prediction encoding algorithm and the inter-frame prediction encoding algorithm as an example, the process of "encoding the original pictures according to the encoding format, to generate a GOP" specifically may include: determining whether it is the first time to obtain the original pictures from the original video data; if yes, encoding the original pictures by using the intra-frame prediction encoding algorithm and the inter-frame prediction encoding algorithm, so that a frame type of a first frame in the generated GOP is an I frame, and frame types of other frames are P frames; and if no, encoding the original pictures by using the inter-frame prediction encoding algorithm, so that the frame type of the first frame in the generated GOP is a GF frame, and the frame types of the other frames are P frames.

The P frame is configured to record change information of a current frame relative to an adjacent previous I frame, GF frame, or P frame. That is, the P frame may search in the adjacent previous I frame, GF frame, or P frame in this GOP when searching for a reference block.

Herein, in an embodiment of the present disclosure, a special P frame (SP frame) and an enhanced P frame (P_WITHSP frame) may be developed from the P frame by rewriting a reference relationship of the P frame. Therefore, in some embodiments, to improve an anti-packet loss rate, the SP frame or the enhanced P frame may be used to replace the P frame in the GOP.

The SP frame and the enhanced P frame differ from the P frame in that after the foregoing development, the P frame successively refers to adjacent previous frames. Frame types of the previous frames may be I frames, GF frames, P frames, SP frames, or enhanced P frames. A reference frame of the SP frame may be an I frame, a GF frame, a P frame, or an SP frame previous to the SP frame in the GOP. The SP frame may search in the I frame, the GF frame, the P frame, or the SP frame previous to the SP frame in the GOP when searching for a reference block.

Figure 3A:
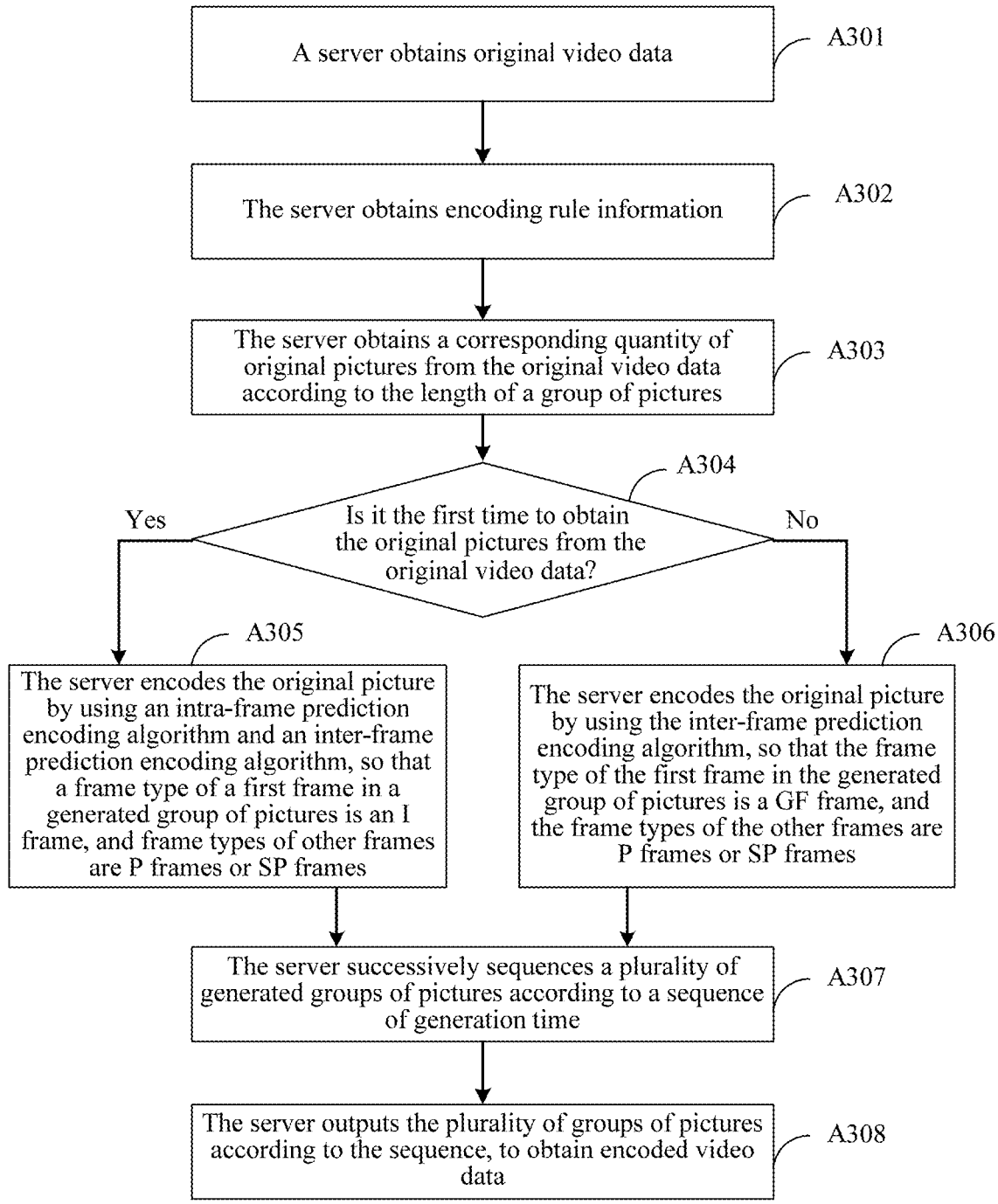
FIG. 3A is another flowchart of a video data encoding method according to an embodiment of the present disclosure.
Figure 3B:
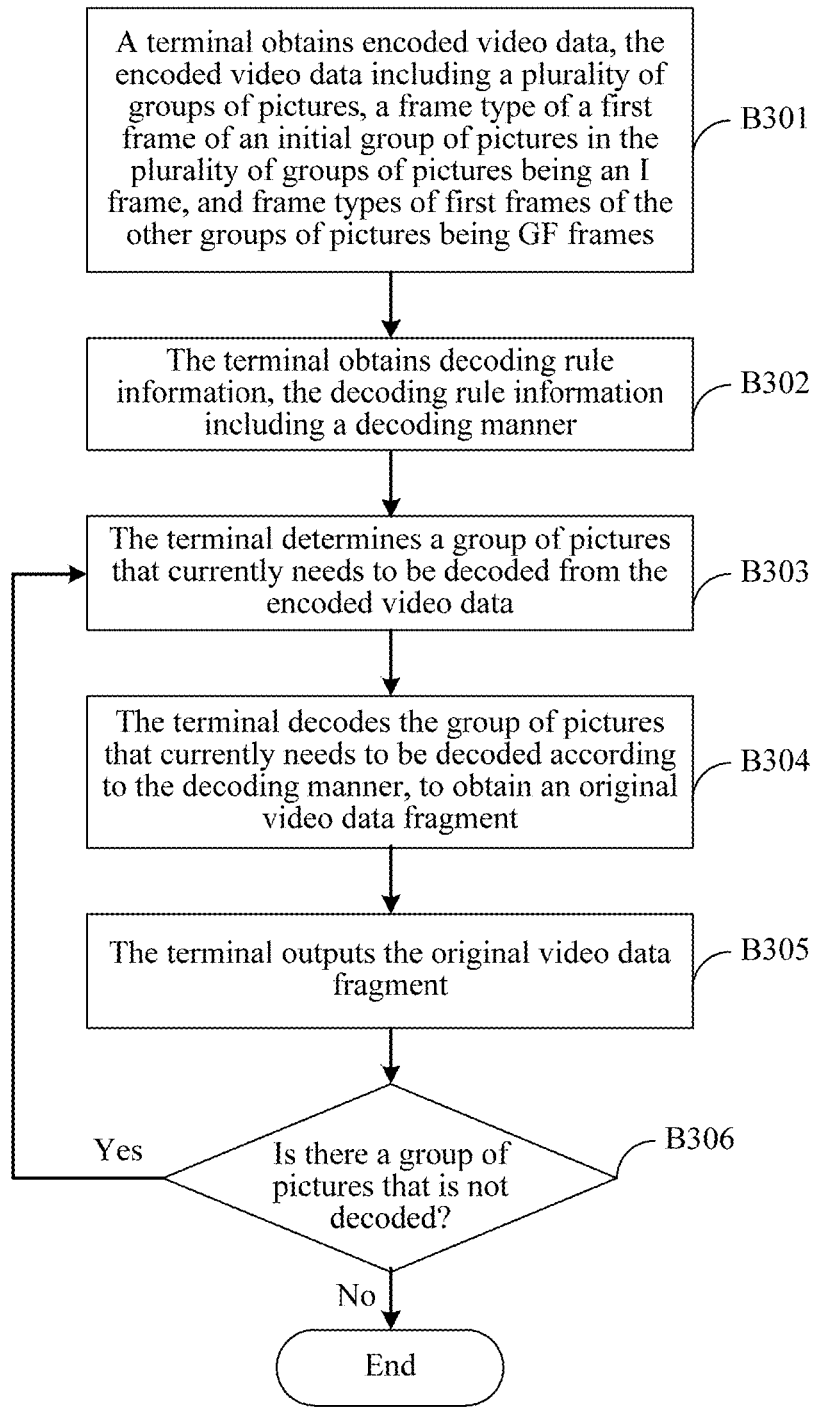
FIG. 3B is another flowchart of a video data decoding method according to an embodiment of the present disclosure.
Figure 3C:
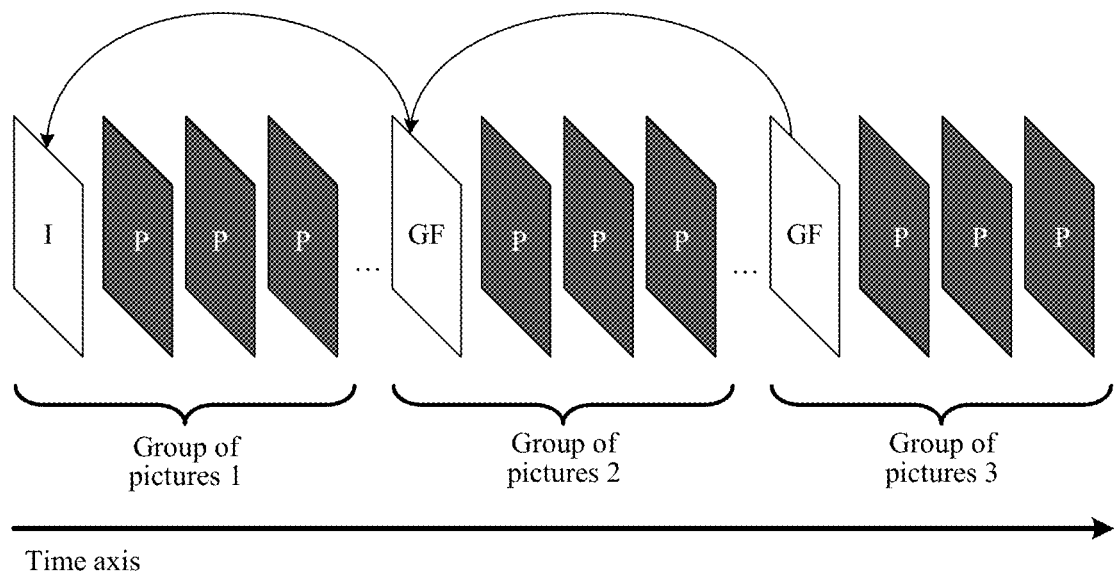
FIG. 3C is a schematic diagram of a reference method between groups of pictures in a method according to an embodiment of the present disclosure.
Figure 3D:
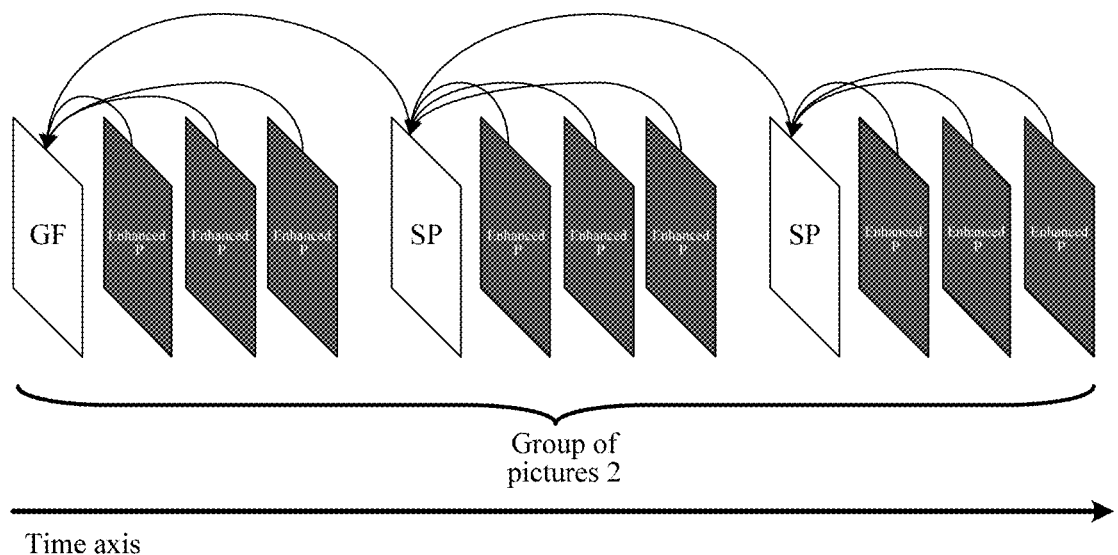
FIG. 3D is a schematic diagram of a reference method between frames in a group of pictures in a method according to an embodiment of the present disclosure.

As shown in FIG. 3D, a reference frame of the SP frame may be an adjacent previous GF frame or SP frame. The enhanced P frame may successively refer to adjacent previous frames. Frame types of the previous frames may be I frames, GF frames, P frames, SP frames, or enhanced P frames. In addition to the previous frames, the enhanced P frame may further refer to I frames, GF frames, P frames, or SP frames previous to the enhanced P frame in the GOP. It should be noted that the SP frame cannot refer to a previous enhanced P frame. As shown in FIG. 3D, a reference frame of the enhanced P frame may be a GF frame or an SP frame previous to the current frame. That is, the enhanced P frame may search in an I frame, a GF frame, a P frame, an SP frame, or an enhanced P frame previous to the enhanced P frame in the GOP when searching for a reference block. The enhanced P frame is configured to record change information of the current frame relative to an I frame, a GF frame, a P frame, an SP frame, or a previous enhanced P frame in this GOP.

The reference relationship of the P frame is referring to an adjacent previous frame in the GOP, the reference relationship of the SP frame is referring to an I frame, a GF frame, a P frame, or an SP frame previous to the SP frame in the GOP, and the reference relationship of the enhanced P frame is referring to an adjacent previous frame in the GOP or an I frame, a GF frame, a P frame, or an SP frame previous to the enhanced P frame in the GOP, being different from the P frame that is limited to merely successively refer to the previous frame; and the reference relationship is expanded. Therefore, when incorrect decoding occurs because an adjacent previous frame of a current SP frame or enhanced P frame is lost, decoding of the current or a subsequent SP frame or enhanced P frame is not affected (because the reference relationship of current SP frame or enhanced P frame is not limited to the previous frame, and may refer to an I frame, a GF frame, a P frame, or an SP frame previous to the current frame), thereby improving an anti-packet loss capability.

That is, in some embodiments, the process of "encoding the original pictures according to the encoding format, to generate a GOP" may also include: determining whether it is the first time to obtain the original pictures from the original video data; if yes, encoding the original pictures by using the intra-frame prediction encoding algorithm and the inter-frame prediction encoding algorithm, so that a frame type of a first frame in the generated GOP is an I frame, and frame types of other frames are SP frames or enhanced P frames; and if no, encoding the original pictures by using the inter-frame prediction encoding algorithm, so that the frame type of the first frame in the generated GOP is a GF frame, and the frame types of the other frames are SP frames or enhanced P frames.

(4) Sequentially arranging the plurality of generated GOPs according to a sequence of generation time.

In some embodiments, to facilitate subsequent sequencing, serial numbers may further be added to the generated GOPs when the original picture is being encoded. That is, at the process of "encoding the original pictures according to the encoding format, to generate a GOP", the video data encoding method may further include: adding serial numbers to the generated GOPs according to the sequence of the generation time.

In this case, the process of "sequentially arranging the plurality of generated GOPs according to a sequence of generation time" specifically may be: arranging the plurality of generated GOPs according to a sequence of the serial numbers.

103. Successively outputting the plurality of GOPs according to the sequence, to obtain encoded video data.

Accordingly, in this embodiment, the original video data may be encoded after being obtained, to generate a plurality of sequentially arranged GOPs; and subsequently, the plurality of GOPs are successively outputted according to the sequence, to obtain the encoded video data, where the frame type of the first frame of the initial GOP in the plurality of GOPs is an I frame, the frame types of the first frames of the other GOPs are GF frames, and the GF frame is configured to record the change information of the current frame relative to the I frame or the GF frame in the previous GOP. In this solution, the GF frame refers to the I frame or the GF frame in a previous GOP. Therefore, even when a frame in the GOP is lost, other frames in the GOP would not be affected. In addition, the size of the GF frame is smaller than that of the I frame, so that downloading and decoding of a subsequent GOP are quicker, and the video data can be quickly downloaded under a low network speed, so as to smoothly present the video data. Therefore, this solution can significantly improve an packet-loss resistance, so as to avoid delayed play or frame freezing, thereby helping to the improve a play effect.

In one embodiment, a video data decoding method is provided, and the description is made from the perspective of a video data decoding device. The video data decoding device may be specifically integrated into a device such as a terminal. Specifically, the decoding device may be applied to, for example, a scenario such as live broadcast having higher requirements on real time and smooth.

The video data decoding method includes: obtaining encoded video data, the encoded video data including a plurality of GOPs, a frame type of a first frame of an initial GOP in the plurality of GOPs being an I frame, frame types of first frames of the other GOPs being GF frames, and the GF frame being configured to record change information of a current frame relative to an I frame or a GF frame in a previous GOP; successively decoding the GOPs in the encoded video data, to obtain original video data; and outputting the original video data.

Figure 2:
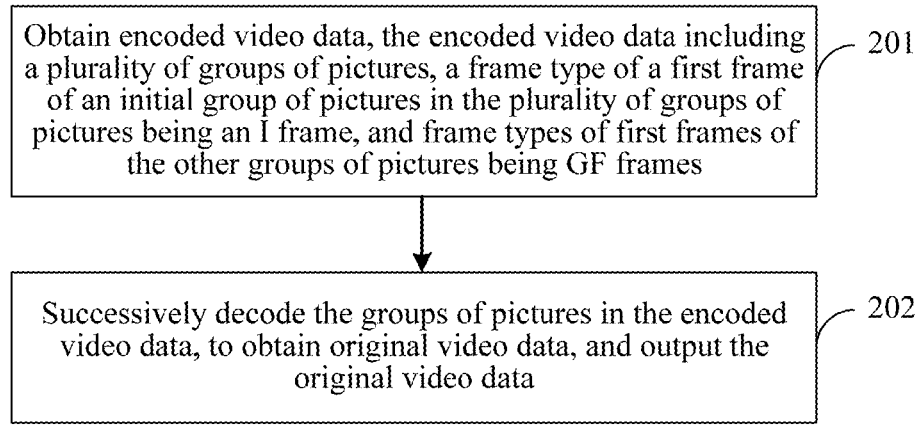
FIG. 2 is a flowchart of a video data decoding method according to an embodiment of the present disclosure.

As shown in FIG. 2, a specific process of the video data decoding method may be as follows.

201. Obtaining encoded video data, the encoded video data including a plurality of GOPs, a frame type of a first frame of an initial GOP in the plurality of GOPs being an I frame, and frame types of first frames of the other GOPs being GF frames.

The I frame refers to an intra-prediction frame, does not rely one other frames while being decoded, is an entry point for random access, and is also a reference frame for decoding. That is, the I frame only searches in the current frame when searching for a reference block. For example, if a frame type of a frame "A" is an I frame, the reference block is searched for only in the fame "A" when the fame "A" is being decoded. Moreover, the GF frame is mainly configured to record change information of the current frame relative to the I frame or the GF frame in the previous GOP. That is, the GF frame may search in the I frame or the GF frame in the previous GOP when searching for a reference block. For example, if a frame type of a frame "B" is "GF", the I frame or the GF frame in the previous GOP may be used as a reference when the fame "B" is being decoded.

202. Successively decoding the GOPs in the encoded video data, to obtain original video data, and outputting the original video data. For example, this specifically may include the followings.

(1) Obtaining decoding rule information, the decoding rule information including a decoding format;

The decoding format may include information such as an intra-frame prediction encoding algorithm and an inter-frame prediction decoding algorithm.

(2) Determining a GOP that currently needs to be decoded from the encoded video data.

(3) Decoding the GOP that currently needs to be decoded according to the decoding format, to obtain a corresponding original video data segment. For example, this specifically may include the followings.

A. Determining a frame that currently needs to be decoded and a corresponding frame type from the GOP that currently needs to be decoded.

B. Decoding the frame that currently needs to be decoded by selecting a corresponding decoding algorithm according to the determined frame type. For example, this specifically may include the followings.

If a frame type of the frame that currently needs to be decoded is an I frame, decoding the frame that currently needs to be decoded by using the intra-frame prediction encoding algorithm.

If the frame type of the frame that currently needs to be decoded is a GF frame, decoding the frame that currently needs to be decoded by using the inter-frame prediction decoding algorithm and using an I frame or a GF frame in a previous GOP as a reference.

If the frame type of the frame that currently needs to be decoded is a P frame, decoding the frame that currently needs to be decoded by using the inter-frame prediction decoding algorithm and using an adjacent previous frame of the frame that currently needs to be decoded as a reference.

If the frame type of the frame that currently needs to be decoded is an SP frame, decoding the frame that currently needs to be decoded by using the inter-frame prediction decoding algorithm and using an I frame, a GF frame, a P frame, or an SP frame previous to the frame that currently needs to be decoded in this GOP as a reference.

If the frame type of the frame that currently needs to be decoded is an enhanced P frame, decoding the frame that needs to be currently decoded by using the inter-frame prediction decoding algorithm and using an I frame, a GF frame, an SP frame, or an enhanced P frame previous to the frame that currently needs to be decoded in the image group that currently needs to be decoded as a reference or using an adjacent previous enhanced P frame of the frame that currently needs to be decoded as a reference.

C. Performing the process of determining the frame that currently needs to be decoded and the corresponding frame type from the GOP that currently needs to be decoded, that is, performing the above step A until all frames in the GOP that currently needs to be decoded have been decoded.

For example, whether there is a frame that is not decoded in the GOP that currently needs to be decoded may be determined. If yes, step A is performed, and if no, step D below is performed.

D. Outputting the decoded frames according to a sequence of decoding, to obtain the original video data segment corresponding to the GOP that currently needs to be decoded.

(4) Outputting the original video data segment, and performing the process of determining the GOP that currently needs to be decoded from the second video data, that is, performing step (2), until all the GOPs in the second video data have been decoded.

For example, whether there is a GOP that is not decoded in the encoded video data may be determined. If yes, step (2) is performed, and if no, the process completes.

Accordingly, with the encoded video data, the frame type of the first frame of the initial GOP is an I frame, the frame types of the first frames of the other GOPs are GF frames, and the GF frame is mainly configured to record the change information of the current frame relative to the I frame or the GF frame in the previous GOP. That is, the GF frame refers to the I frame or the GF frame in the previous GOP. Therefore, although a frame in the GOP is lost, other frames in the GOP would not be affected. In addition, because the size of the GF frame is smaller than that of the I frame, downloading and decoding of a subsequent GOP are quicker, and even the video data can be quickly downloaded under a low network speed. Therefore, with respect to an existing solution, this solution can significantly improve an packet-loss resistance, so as to avoid delayed play or frame freezing, thereby helping to the improve a play effect.

In this embodiment, description is made by using an example in which the video data encoding device is specifically integrated into a server, and the video data decoding device is specifically integrated into a terminal.

The server may encode the original video data to generate a plurality of sequentially arranged GOPs; then successively output the plurality of GOPs to obtain the encoded video data; and transmit the encoded video data to the terminal. The encoded video data is decoded and played by the terminal. The followings describe the processes of encoding and decoding are respectively.

(I) Encoding;

As shown in FIG. 3A, a video data encoding method is provided, including the followings.

A301. A server obtains original video data.

For example, the server may obtain the original video data locally (on the server), or may obtain the original video data from another device.

The original video data may include original audio data and original picture data. The original picture data may include a plurality of original pictures.

A302. The server obtains encoding rule information.

The encoding rule information may include information such as the length of the GOP and an encoding format. This may be set according to requirements of actual applications, and details are not described herein again.

The length of the GOP may be described as that the I frame or the GF frame occurs once every how many frames, and is usually recorded as N. Moreover, the encoding format may include information such as an intra-frame prediction encoding algorithm and an inter-frame prediction encoding algorithm.

A303. The server obtains a corresponding number of original pictures from the original video data according to the length of the GOP.

For example, if the length N of the GOP is 15, 15 original pictures may be obtained from the original video data.

A304. The server determines whether it is the first time to obtain the original pictures from the original video data, if yes, performs step A305, and if no, performs step A306.

For example, whether it is the first time to obtain the original pictures from the original video data may be determined specifically by using a time axis. For example, if a current position on the time axis where the original video data is located is a start position of the original video data, it indicates that it is the first time to obtain the original pictures from the original video data. Otherwise, if the current position on the time axis where the original video data is located is not the start position of the original video data, it indicates that it is not the first time to obtain the original pictures from the original video data.

A305. The server encodes the original picture by using an intra-frame prediction encoding algorithm and an inter-frame prediction encoding algorithm, so that the frame type of the first frame in the generated GOP is an I frame, and frame types of other frames (other frames other than the first frame in the GOP) are P frames or SP frames; and subsequently, performs step A307.

For example, an original picture to be encoded may be determined from the obtained original pictures according to a sequence of the time axis, so as to obtain a current original picture. Whether the current original picture is a first original picture of the GOP is determined, if yes, a reference block may be determined from the current original picture, and the current original picture is encoded by using the intra-frame prediction encoding algorithm according to the reference block, so as to obtain a corresponding I frame. If it is determined that the current original picture is not the first original picture of the GOP, change information of the current original picture relative to a previous original picture may be obtained, and the current original picture is encoded by using the inter-frame prediction encoding algorithm according to the change information, so as to obtain a corresponding P frame. Alternatively, change information of the current original picture relative to an original picture of an I frame, a GF frame, a P frame, or an SP frame previous to the current original picture in the GOP may be obtained, and the current original picture is encoded by using the inter-frame prediction encoding algorithm according to the change information, so as to obtain a corresponding SP frame.

A306. The server encodes the original picture by using the inter-frame prediction encoding algorithm, so that the frame type of the first frame in the generated GOP is a GF frame, and the frame types of the other frames (other frames other than the first frame in the GOP) are P frames or SP frames; and subsequently, performs step A307.

For example, the original picture that currently needs to be encoded may be determined from the obtained original pictures according to the sequence of the time axis, so as to obtain the current original picture. Whether the current original picture is the first original picture of the GOP is determined, if yes, change information of the current original picture relative to an I frame or a GF frame in a previous GOP may be obtained, and the current original picture is encoded by using the inter-frame prediction encoding algorithm according to the change information, so as to obtain a corresponding GF frame; otherwise, if it is determined that the current original picture is not the first original picture of the GOP, the change information of the current original picture relative to the previous original picture may be obtained, and the current original picture is encoded by using the inter-frame prediction encoding algorithm according to the change information, so as to obtain the corresponding P frame. Alternatively, the change information of the current original picture relative to the original picture of the I frame, the GF frame, the P frame, or the SP frame previous to the current original picture in the GOP may be obtained, and the current original picture is encoded by using the inter-frame prediction encoding algorithm according to the change information, so as to obtain the corresponding SP frame.

In some embodiments, to further improve an anti-packet loss rate, an enhanced P frame (P_WITHSP) may further be used to replace the P frame. The enhanced P frame is configured to record change information of the current frame relative to a previous frame adjacent to the current frame or an I frame, a GF frame, a P frame, an SP frame, or an enhanced P frame previous to the current frame in this GOP. Details are not described herein again.

A307. The server sequentially arranges the plurality of generated GOPs according to a sequence of generation time.

In some embodiments, to facilitate subsequently arrange the GOPs, serial numbers may further be added to the generated GOPs according to the sequence of the generation time when the original picture is being encoded. In this way, the plurality of generated GOPs may be sequenced according to a sequence of the serial numbers.

A308. The server outputs the plurality of GOPs according to the sequence to obtain encoded video data.

(II) Decoding

As shown in FIG. 3B, a video data decoding method is provided, including the followings.

B301. A terminal obtains encoded video data. For example, the terminal may receive the encoded video data sent by a server.

The encoded video data includes a plurality of GOPs, the frame type of the first frame of an initial GOP in the plurality of GOPs is an I frame, and frame types of first frames of the other GOPs are GF frames.

B302. The terminal obtains decoding rule information, the decoding rule information including a decoding format.

The decoding format may include information such as an intra-frame prediction encoding algorithm and an inter-frame prediction decoding algorithm. This may be set according to requirements of actual applications, and details are not described herein again.

B303. The terminal determines a GOP that currently needs to be decoded from the encoded video data.

For example, the GOPs may be successively obtained according to a sequence of a time axis, and serve as GOPs that currently need to be decoded. For example, refer to FIG. 3C, a GOP 1 may be first determined as the GOP that currently needs to be decoded; after the GOP 1 is encoded, a GOP 2 is determined as the GOP that currently needs to be decoded; after the GOP 2 is encoded, a GOP 3 is determined as the GOP that currently needs to be decoded; and the rest may be deduced similarly.

B304. The terminal decodes the GOP that currently needs to be decoded according to the decoding format, to obtain a corresponding original video data segment. For example, this specifically may be as follows.

(1) The terminal determines a frame that currently needs to be decoded and a corresponding frame type from the GOP that currently needs to be decoded.

(2) The terminal decodes the frame that currently needs to be decoded by selecting a corresponding decoding algorithm according to the determined frame type. For example, this specifically may be as follows:

The frame that currently needs to be decoded is decoded by using the intra-frame prediction encoding algorithm if the frame type of the frame that currently needs to be decoded is an I frame.

The frame that currently needs to be decoded is decoded by using the intra-frame prediction encoding algorithm and using an I frame or a GF frame in a previous GOP as a reference if the frame type of the frame that currently needs to be decoded is a GF frame. For example, referring to FIG. 3C, a GF frame in the GOP 2 may use an I frame in the GOP 1 as a reference, and a GF frame in the GOP 3 may use the GF frame in the GOP 2 as a reference. It should be noted that for ease of description, in FIG. 3C, description is made merely by using the P frame as an example. It should be understood that the P frame in the figure may also be replaced with an SP frame or an enhanced P frame, and details are not described herein again.

The frame that currently needs to be decoded is decoded by using the inter-frame prediction decoding algorithm and using an adjacent previous frame of the frame that currently needs to be decoded as a reference if the frame type of the frame that currently needs to be decoded is a P frame.

The frame that currently needs to be decoded is decoded by using the inter-frame prediction decoding algorithm and using an I frame, a GF frame, a P frame, or an SP frame previous to the frame that currently needs to be decoded in this GOP as a reference if the frame type of the frame that currently needs to be decoded is an SP frame.

The frame that currently needs to be decoded is decoded by using the inter-frame prediction decoding algorithm and using an I frame, a GF frame, a P frame, or an SP frame of a previous I frame, GF frame, P frame, or SP frame in the GOP that currently needs to be decoded as a reference or using an adjacent previous enhanced P frame of the frame that currently needs to be decoded as a reference if the frame type of the frame that currently needs to be decoded is an enhanced P frame. For example, refer to FIG. 3D, using the GOP 2 as an example, the enhanced P frame may be decoded by using a GF frame or an SP frame previous to the enhanced P frame in the GOP as a reference. It should be noted that for ease of description, only the GF frame and the SP frame are illustrated in FIG. 3D. It should be understood that the I frame or a previous enhanced P frame adjacent to the enhanced P frame may be used as a reference, and details are not described herein again.

(3) The terminal determines whether there is a frame that is not decoded in the GOP that currently needs to be decoded, if yes, performs step (1), and if no, performs step (4).

(4) The terminal outputs the decoded frames according to a sequence of decoding, to obtain the original video data segment corresponding to the GOP that currently needs to be decoded.

B305. The terminal outputs the original video data segment.

B306. The terminal determines whether there is a GOP that is not decoded in the encoded video data, if yes, performs step B303, and if no, ends the process.

Accordingly, in this solution, the GF frame refers to the I frame or the GF frame in a previous GOP. Therefore, even when a frame in the GOP is lost, other frames in the GOP would not be affected. In addition, because the size of the GF frame is smaller than that of the I frame, downloading and decoding of a subsequent GOP are quicker, and even the video data can be quickly downloaded under a low network speed, so as to smoothly present the video data. Therefore, this solution can significantly improve an packet-loss resistance, so as to avoid delayed play or frame freezing, thereby helping to the improve a play effect.

Further, in an embodiment of the present disclosure, the P frame may be replaced with an enhanced P frame. The enhanced P frame may use an I frame, a GF frame, an SP frame, or an enhanced P frame previous to the current enhanced P frame in the GOP as a reference, or use a previous enhanced P frame adjacent to the current enhanced P frame as a reference. Therefore, although a frame is not decoded, a subsequent enhanced P frame of the current enhanced P frame would not be affected. Therefore, the packet-loss resistance may be further improved, so as to improve the play effect.

In addition to the foregoing encoding method, in some embodiments, the present disclosure further provides a video data encoding method, including: obtaining original video data; encoding the original video data, to generate a plurality of sequentially arranged GOPs, a frame type of any non-first frame in the plurality of GOPs being an SP frame or an enhanced P frame, the SP frame being configured to record change information of a current frame relative to an I frame, a GF frame, a P frame, or an SP frame previous to the current frame in this GOP, and the enhanced P frame being configured to record change information of the current frame relative to a previous frame adjacent to the current frame or the I frame, the GF frame, the P frame, the SP frame, or an enhanced P frame previous to the current frame in this GOP; and successively outputting the plurality of GOPs according to the sequence, to obtain encoded video data.

In some embodiments, the encoding the original video data, to generate a plurality of sequentially arranged GOPs includes that: a frame type of any first frame in the plurality of GOPs is an I frame or a GF frame, where the GF frame is configured to record change information of the current frame relative to an I frame or a GF frame in a previous group of pictures.

In some embodiments, the encoding the original video data, to generate a plurality of sequentially arranged GOPs includes: obtaining encoding rule information, where the encoding rule information includes the length of the GOP and an encoding format; obtaining a corresponding number of original pictures from the original video data according to the length of the GOP; encoding the original pictures according to the encoding format, to generate a GOP, and performing the process of the obtaining a corresponding number of original pictures from the original video data according to the length of the GOP, until all original pictures in the original video data have been encoded; and sequentially arranging the plurality of generated GOPs according to a sequence of generation time.

In some embodiments, the encoding format includes an intra-frame prediction encoding algorithm and an inter-frame prediction encoding algorithm. The encoding the original pictures according to the encoding format, to generate a GOP includes: encoding the original picture by using the intra-frame prediction encoding algorithm or the inter-frame prediction encoding algorithm, so that a frame type of a first frame in the generated GOP is an I frame or a G frame, and frame types of other frames are SP frames or enhanced P frames.

In some embodiments, the encoding the original pictures according to the encoding format, to generate a GOP further includes adding a serial number to the generated GOP according to the sequence of the generation time; and the sequentially arranging the plurality of generated GOPs according to a sequence of generation time specifically is: arranging the plurality of generated GOPs according to a sequence of the serial numbers.

In some embodiments, the present disclosure further provides a video data decoding method, including: obtaining encoded video data, the encoded video data including a plurality of GOPs, a frame type of any non-first frame in the plurality of GOPs being an SP frame or an enhanced P frame, the SP frame being configured to record change information of a current frame relative to an I frame, a GF frame, a P frame, or an SP frame of the current frame in this GOP, and the enhanced P frame being configured to record change information of the current frame relative to a previous frame adjacent to the current frame or the I frame, the GF frame, the P frame, the SP frame, or an enhanced P frame previous to the current frame in this GOP; successively decoding the GOPs in the encoded video data, to obtain original video data; and outputting the original video data.

According to the foregoing technical solutions, replacing the P frame of any non-first frame in the GOP with the SP frame or the enhanced P frame enlarges a reference relationship of the non-first frame in the GOP. Therefore, although a non-first frame in the GOP is not decoded, a subsequent SP frame or enhanced P frame of the non-first frame would not be affected, so as to further improve the packet-loss resistance and the play effect.

Figure 4:
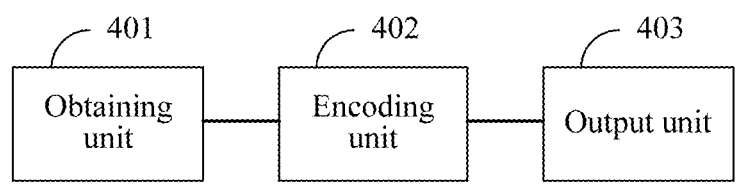
FIG. 4 is a schematic structural diagram of a video data encoding device according to an embodiment of the present disclosure.

To better implement the foregoing method, an embodiment of the present disclosure further provides a video data encoding device. As shown in FIG. 4, the video data encoding device includes an obtaining unit 401, an encoding unit 402, and an output unit 403.

(1) The Obtaining Unit 401

The obtaining unit 401 is configured to obtain original video data. The original video data may include original audio data and original picture data. The original picture data may include a plurality of original pictures.

(2) The Encoding Unit 402

The encoding unit 402 is configured to encode the original video data, to generate a plurality of sequentially arranged GOPs, a frame type of a first frame of an initial GOP in the plurality of GOPs being an I frame, and frame types of first frames of the other GOPs being GF frames.

The I frame refers to an intra-prediction frame. That is, the I frame only searches in the current frame when searching for a reference block. The GF frame is mainly configured to record change information of the current frame relative to the I frame or the GF frame in a previous GOP. That is, the GF frame may search in the I frame or the GF frame in the previous GOP when searching for a reference block.

For example, the encoding unit 402 may include an obtaining subunit, an encoding subunit, and a arranging subunit. The obtaining subunit may be configured to obtain encoding rule information, the encoding rule information including the length of the GOP and an encoding format; and obtain a corresponding number of original pictures from the original video data according to the length of the GOP.

The length of the GOP may be described as that the I frame or the GF frame occurs once every how many frames, and is usually recorded as N. Moreover, the encoding format may include information such as an intra-frame prediction encoding algorithm and an inter-frame prediction encoding algorithm.

The encoding subunit may be configured to encode the original pictures according to the encoding format, to generate a GOP, and trigger the obtaining subunit to perform the operation of the obtaining a corresponding number of original pictures from the original video data according to the length of the GOP, until all original pictures in the original video data have been encoded.

The arranging subunit is configured to sequentially arrange the plurality of generated GOPs according to a sequence of generation time. For example, using that the encoding format includes the intra-frame prediction encoding algorithm and the inter-frame prediction encoding algorithm as an example, The encoding subunit may be specifically configured to determine whether it is the first time to obtain the original pictures from the original video data; if yes, encode the original pictures by using the intra-frame prediction encoding algorithm and the inter-frame prediction encoding algorithm, so that a frame type of a first frame in the generated GOP is an I frame, and frame types of the other frames are P frames or SP frames; and if no, encode the original pictures by using the inter-frame prediction encoding algorithm, so that the frame type of the first frame in the generated GOP is a GF frame, and the frame types of the other frames are P frames or SP frames.

In some embodiments, to further improve an anti-packet loss rate, an enhanced P frame (P_WITHSP) may further be used to replace the P frame. The enhanced P frame is configured to record change information of the current frame relative to a previous frame adjacent to the current enhanced P frame or an I frame, a GF frame, a P frame, an SP frame, or an enhanced P frame previous to the current enhanced P frame in this GOP.

That is, the encoding subunit may be specifically configured to determine whether it is the first time to obtain the original pictures from the original video data; if yes, encode the original pictures by using the intra-frame prediction encoding algorithm and the inter-frame prediction encoding algorithm, so that the frame type of the first frame in the generated GOP is an I frame, and the frame types of the other frames are SP frames or enhanced P frames; and if no, encode the original pictures by using the inter-frame prediction encoding algorithm, so that the frame type of the first frame in the generated GOP is a GF frame, and the frame types of the other frames are SP frames or enhanced P frames.

In some embodiments, to facilitate subsequent arranging, serial numbers may further be added to the generated GOPs when the original picture is being encoded. That is, The encoding subunit may further be configured to add the serial numbers to the generated GOPs according to the sequence of the generation time. The arranging subunit may be specifically configured to sequence the plurality of generated GOPs according to a sequence of the serial numbers.

(3) The Output Unit 403

The output unit 403 may be configured to successively output the plurality of GOPs according to the sequence, to obtain encoded video data.

In specific implementations, the foregoing units may be implemented as independent entities, or may be randomly combined to be implemented as one or more entities. Reference may be made to the foregoing method embodiments for specific implementations of the foregoing units, and details are not described herein again. The video data encoding device may be specifically integrated into a device such as a server or a terminal.

Accordingly, the encoding unit 402 may encode the original video data after the obtaining unit 401 of the video data encoding device in this embodiment obtains the original video data, to generate a plurality of sequentially arranged GOPs. Subsequently, the output unit 403 successively outputs the plurality of GOPs according to the sequence, to obtain the encoded video data, where the frame type of the first frame of the initial GOP in the plurality of GOPs is an I frame, the frame types of the first frames of the other GOPs are GF frames, and the GF frame is configured to record the change information of the current frame relative to the I frame or the GF frame in a previous GOP. In this solution, the GF frame refers to the I frame or the GF frame in a previous GOP. Therefore, even when a frame in the GOP is lost, other frames in the GOP would not be affected. In addition, the size of the GF frame is smaller than that of the I frame, so that downloading and decoding of a subsequent GOP are quicker, and even the video data can be quickly downloaded under a low network speed, so as to smoothly present the video data. Therefore, with respect to an existing solution, this solution can significantly improve an packet-loss resistance, so as to avoid delayed play or frame freezing, thereby helping to the improve a play effect.

Figure 5:
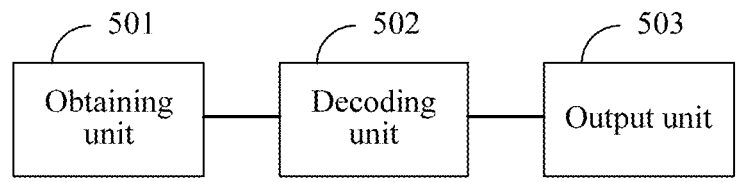
FIG. 5 is a schematic structural diagram of a video data decoding device according to an embodiment of the present disclosure.

Correspondingly, an embodiment of the present disclosure further provides a video data decoding device. As shown in FIG. 5, the video data decoding device includes an obtaining unit 501, a decoding unit 502, and an output unit 503.

(1) The Obtaining Unit 501

The obtaining unit 501 is configured to obtain encoded video data, the encoded video data including a plurality of GOPs, a frame type of a first frame of an initial GOP in the plurality of GOPs being an I frame, and frame types of first frames of the other GOPs being GF frames.

The I frame refers to an intra-prediction frame. That is, the I frame only searches in the current frame when searching for a reference block. The GF frame is mainly configured to record change information of the current frame relative to the I frame or the GF frame in a previous GOP. That is, the GF frame may search in the I frame or the GF frame in the previous GOP when searching for a reference block.

(2) The Decoding Unit 502

The decoding unit 502 is configured to successively decode the GOPs in the encoded video data, to obtain original video data. For example, the decoding unit 502 may include an obtaining subunit, a determining subunit, and a decoding subunit.

The obtaining subunit is configured to obtain decoding rule information, where the decoding rule information may include information such as a decoding format.

The decoding format may include information such as an intra-frame prediction encoding algorithm and an inter-frame prediction decoding algorithm.

The determining subunit is configured to determine a GOP that currently needs to be decoded from the encoded video data.

The decoding subunit is configured to decode the GOP that currently needs to be decoded according to the decoding format, to obtain a corresponding original video data segment. For example, this specifically may include: determining a frame that currently needs to be decoded and a corresponding frame type from the GOP that currently needs to be decoded; decoding the frame that currently needs to be decoded by selecting a corresponding decoding algorithm according to the determined frame type, and performing the process of the determining a frame that currently needs to be decoded and a corresponding frame type from the GOP that currently needs to be decoded, until all frames in the GOP that currently needs to be decoded have been decoded; and outputting the decoded frames according to a sequence of decoding, to obtain the original video data segment corresponding to the GOP that currently needs to be decoded.

In this case, the output unit 503 may be specifically configured to output the original video data segment, and trigger the obtaining unit 501 to perform the operation of the determining the GOP that currently needs to be decoded from the encoded video data, until all GOPs in the encoded video data have been decoded.

A corresponding relationship between the frame type and the decoding algorithm may be set according to actual application, for example, may be preset according to the encoding algorithm. For example, the decoding subunit may be specifically configured to: decode the frame that currently needs to be decoded by using the intra-frame prediction encoding algorithm if a frame type of the frame that currently needs to be decoded is an I frame; decode the frame that currently needs to be decoded by using the inter-frame prediction decoding algorithm and using an I frame or a GF frame in a previous GOP as a reference if the frame type of the frame that currently needs to be decoded is a GF frame; decode the frame that currently needs to be decoded by using the inter-frame prediction decoding algorithm and using an adjacent previous frame of the frame that currently needs to be decoded as a reference if the frame type of the frame that currently needs to be decoded is a P frame; decode the frame that currently needs to be decoded by using the inter-frame prediction decoding algorithm and using an I frame, a GF frame, a P frame, or an SP frame previous to the frame that currently needs to be decoded in this GOP as a reference if the frame type of the frame that currently needs to be decoded is an SP frame; and decode the frame that needs to be currently decoded by using the inter-frame prediction decoding algorithm and using an I frame, a GF frame, an SP frame, or an enhanced P frame previous to the frame that currently needs to be decoded in the GOP that currently needs to be decoded as a reference or using an adjacent previous enhanced P frame of the frame that currently needs to be decoded as a reference if the frame type of the frame that currently needs to be decoded is an enhanced P frame.

(3) The Output Unit 503

The output unit 503 is configured to output the original video data. In specific implementations, the foregoing units may be implemented as independent entities, or may be randomly combined to be implemented as one or more entities. Reference may be made to the foregoing method embodiments for specific implementations of the foregoing units, and details are not described herein again. The video data decoding device may be specifically integrated into a device such as a terminal.

Accordingly, in the video data decoding device provided in this embodiment, in the encoded video data obtained by the obtaining unit 501, the frame type of the first frame of the initial GOP is an I frame, the frame types of the first frames of the other GOPs are GF frames, and the GF frame is mainly configured to record the change information of the current frame relative to the I frame or the GF frame in the previous GOP. That is, the GF frame refers to the I frame or the GF frame in the previous GOP. Therefore, even when a frame in the GOP is lost, decoding of other frames in the GOP by the decoding unit 502 would not be affected. In addition, because the size of the GF frame is smaller than that of the I frame, downloading and decoding of a subsequent GOP are quicker, and even the video data can be quickly downloaded under a low network speed, so as to smoothly present the video data. Therefore, with respect to an existing solution, this solution can significantly improve an packet-loss resistance, so as to avoid delayed play or frame freezing, thereby helping to the improve a play effect.

In some embodiments, the present disclosure further provides a video data encoding device, including: an obtaining unit, configured to obtain original video data; an encoding unit, configured to encode the original video data, to generate a plurality of sequentially arranged GOPs, a frame type of a non-first frame in the plurality of GOPs being an SP frame or an enhanced P frame, the SP frame being configured to record change information of a current frame relative to an I frame, a GF frame, a P frame, or an SP frame previous to the current frame in this GOP, and the enhanced P frame being configured to record change information of the current frame relative to a previous frame adjacent to the current frame or the I frame, the GF frame, the P frame, the SP frame, or an enhanced P frame previous to the current frame in this GOP; and an output unit, configured to successively output the plurality of GOPs according to the sequence, to obtain encoded video data.

In some embodiments, the present disclosure further provides a video data decoding device, including: an obtaining unit, configured to obtain encoded video data, the encoded video data including a plurality of GOPs, a frame type of a non-first frame in the plurality of GOPs being an SP frame or an enhanced P frame, the SP frame being configured to record change information of a current frame relative to an I frame, a GF frame, a P frame, or an SP frame of the current frame in this GOP, and the enhanced P frame being configured to record change information of the current frame relative to a previous frame adjacent to the current frame or the I frame, the GF frame, the P frame, the SP frame, or an enhanced P frame previous to the current frame in this GOP; a decoding unit, configured to successively decode the GOPs in the encoded video data, to obtain original video data; and an output unit, configured to output the original video data.

Correspondingly, an embodiment of the present disclosure further provides a video data processing system, including any video data encoding device and any video data decoding device provided in the embodiments of the present disclosure. This specifically may be as follows:

A video data encoding device is configured to obtain original video data; encode the original video data, to generate a plurality of sequentially arranged GOPs; and successively outputting the plurality of GOPs according to the sequence, to obtain encoded video data. A frame type of a first frame of an initial GOP in the plurality of GOPs is an I frame, and frame types of first frames of the other GOPs are GF frames. The GF frame is configured to record change information of a current frame relative to an I frame or a GF frame in a previous GOP.

A video data decoding device is configured to obtain encoded video data; successively decode GOPs in the encoded video data, to obtain original video data; and output the original video data.

Reference may be made to the foregoing method embodiments for specific implementations of the foregoing devices, and details are not described herein again.

The video data processing system may include any video data encoding device and any video data decoding device provided in the embodiments of the present disclosure. Therefore, beneficial effects that can be implemented by any video data encoding device and any video data decoding device provided in the embodiments of the present disclosure may be implemented, and details are described in the above and are not described herein again.

Figure 6:
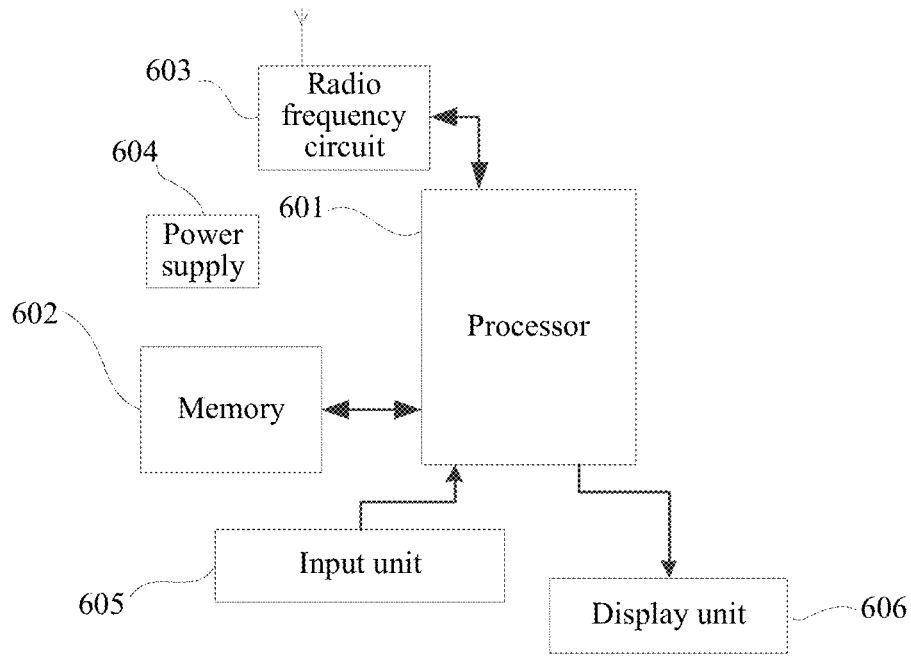
FIG. 6 is a schematic structural diagram of a server according to an embodiment of the present disclosure.

An embodiment of the present disclosure further provides a server. As shown in FIG. 6, a schematic structural diagram of the server in this embodiment of the present disclosure is shown, and specifically:

The server may include components such as a processor 601 including one or more processing cores, a memory 602 including one or more computer readable storage media, a radio frequency (RF) circuit 603, a power supply 604, an input unit 605, and a display unit 606. A person skilled in the art may understand that the server structure shown in FIG. 6 does not constitute a definition to the server, and the server may include more components or fewer components than those shown in the figure, or some components may be combined, or a different component deployment may be used.

The processor 601 is the control center of the server, and is connected to various parts of the server by using various interfaces and lines. By running or executing the software program and/or module stored in the memory 602, and invoking data stored in the memory 602, the processor 601 performs various functions and data processing of the server, thereby performing overall monitoring on the server. In some embodiments, the processor 601 may include one or more processing cores. Preferably, the processor 601 may integrate an application processor and a modem. The application processor mainly processes an operating system, a user interface, an application program, and the like. The modem mainly processes wireless communication. It may be understood that the foregoing modem may also not be integrated into the processor 601.

The memory 602 may be configured to store a software program and module. The processor 601 runs the software program and module stored in the memory 602, to implement various functional applications and data processing. The memory 602 may mainly include a program storage area and a data storage area. The program storage area may store an operating system, an application program required by at least one function (such as a sound playback function and an image display function), and the like. The data storage area may store data created according to use of the server, and the like. In addition, the memory 602 may include a high speed random access memory, and may also include a non-volatile memory such as at least one magnetic disk storage device, a flash memory, or another volatile solid-state storage device. Correspondingly, the memory 602 may further include a memory controller, so as to provide access of the processor 601 to the memory 602.

The RF circuit 603 may be configured to receive and send signals during an information receiving and sending process. Particularly, the RF circuit 603 receives downlink information from a base station, then delivers the downlink information to one or more processors 601 for processing, and sends related uplink data to the base station. Generally, the RF circuit 603 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 603 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The server further includes the power supply 604 (such as a battery) for supplying power to the components. Preferably, the power supply 604 may be logically connected to the processor 601 by using a power management system, thereby implementing functions such as charging, discharging, and power consumption management by using the power management system. The power supply 604 may further include one or more of a direct current or alternating current power supply, a re-charging system, a power failure detection circuit, a power supply converter or inverter, a power supply state indicator, and any other components.

The server may further include the input device 605. The input device 605 may be configured to receive input digit or character information, and generate a keyboard, mouse, joystick, optical, or track ball signal input related to the user setting and function control. Specifically, in a specific embodiment, the input device 605 may include a touch-sensitive surface and another input device. The touch-sensitive surface, which may also be referred to as a touch-screen or a touch panel, may collect a touch operation of a user on or near the touch-sensitive surface (such as an operation of a user on or near the touch-sensitive surface by using any suitable object or accessory, such as a finger or a stylus), and drive a corresponding connection apparatus according to a preset program. In some embodiments, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 601. Moreover, the touch controller can receive and execute a command sent from the processor 601. In addition, the touch-sensitive surface may be a resistive, capacitive, infrared, or surface sound wave type touch-sensitive surface. In addition to the touch-sensitive surface, the input unit 605 may further include the another input device. Specifically, the another input device may include, but is not limited to, one or more of a physical keyboard, a functional key (such as a volume control key or a switch key), a track ball, a mouse, and a joystick.

The server may further include the display unit 606. The display unit 606 may be configured to display information input by the user or information provided for the user, and various graphical user interfaces of the server. The graphical user interfaces may be formed by a graph, a text, an icon, a video, or any combination thereof. The display unit 606 may include a display panel. In some embodiments, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 601, so as to determine a type of a touch event. Then, the processor 601 provides a corresponding visual output on the display panel according to the type of the touch event. Although, in FIG. 6, the touch-sensitive surface and the display panel are used as two separate parts to implement input and output functions, in some embodiments, the touch-sensitive surface and the display panel may be integrated to implement the input and output functions.

Although not shown in the figure, the server may further include a camera, a Bluetooth module, and the like. Details are not described herein again. Specifically, in this embodiment, the processor 601 in the server may load executable files corresponding processes of the one or more application programs to the memory 602 according to the following instructions, and runs the application programs stored in the memory 602, so as to implement various functions: obtaining original video data; encoding the original video data, to generate a plurality of sequentially arranged GOPs; and successively outputting the plurality of GOPs according to the sequence, to obtain encoded video data. A frame type of a first frame of an initial GOP in the plurality of GOPs is an I frame, and frame types of first frames of the other GOPs are GF frames. The GF frame is configured to record change information of a current frame relative to an I frame or a GF frame in a previous GOP.

Reference may be made to the foregoing embodiments for specific implementations and beneficial effects of the foregoing operations, and details are not described herein again.

Figure 7:
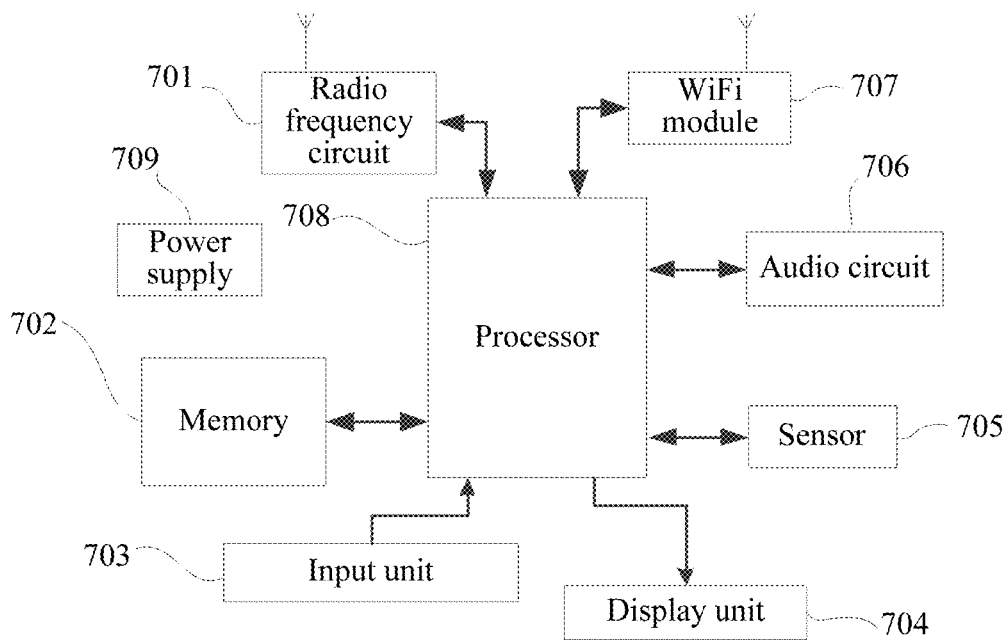
FIG. 7 is a schematic structural diagram of a terminal according to an embodiment of the present disclosure.

Correspondingly, an embodiment of the present disclosure further provides a terminal. As shown in FIG. 7, the terminal may include a component such as a radio frequency (RF) circuit 701, a memory 702 including one or more computer readable storage media, an input unit 703, a display unit 704, a sensor 705, an audio circuit 706, a wireless fidelity (WiFi) module 707, a processor 708 including one or more processing cores, and a power supply 709. A person skilled in the art may understand that the terminal structure shown in FIG. 7 does not constitute a definition to the terminal, and the terminal may include more components or fewer components than those shown in the figure, or some components may be combined, or a different component deployment may be used.

The RF circuit 701 may be configured to receive and send signals during an information receiving and sending process or a call process. Particularly, the RF circuit 701 receives downlink information from a base station, then delivers the downlink information to one or more processors 708 for processing, and sends related uplink data to the base station. Generally, the RF circuit 701 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 701 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 702 may be configured to store a software program and module. The processor 708 runs the software program and module stored in the memory 702, to implement various functional applications and data processing. The memory 702 may mainly include a program storage area and a data storage area. The program storage area may store an operating system, an application program required by at least one function (such as a sound playback function and an image display function), and the like. The data storage area may store data (such as audio data and an address book) created according to use of the terminal, and the like. In addition, the memory 702 may include a high speed random access memory, and may also include a non-volatile memory such as at least one magnetic disk storage device, a flash memory, or another volatile solid-state storage device. Correspondingly, the memory 702 may further include a memory controller, so as to provide access of the processor 708 and the input unit 703 to the memory 702.

The input unit 703 may be configured to receive input digit or character information, and generate a keyboard, mouse, joystick, optical, or track ball signal input related to the user setting and function control. Specifically, in a specific embodiment, the input device 703 may include a touch-sensitive surface and another input device. The touch-sensitive surface, which may also be referred to as a touch-screen or a touch panel, may collect a touch operation of a user on or near the touch-sensitive surface (such as an operation of a user on or near the touch-sensitive surface by using any suitable object or accessory, such as a finger or a stylus), and drive a corresponding connection apparatus according to a preset program. In some embodiments, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 708. Moreover, the touch controller can receive and execute a command sent from the processor 708. In addition, the touch-sensitive surface may be a resistive, capacitive, infrared, or surface sound wave type touch-sensitive surface. In addition to the touch-sensitive surface, the input unit 703 may further include the another input device. Specifically, the another input device may include, but is not limited to, one or more of a physical keyboard, a functional key (such as a volume control key or a switch key), a track ball, a mouse, and a joystick.

The display unit 704 may be configured to display information input by the user or information provided for the user, and various graphical user interfaces of the terminal. The graphical user interfaces may be formed by a graph, a text, an icon, a video, or any combination thereof. The display unit 704 may include a display panel. In some embodiments, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 708, so as to determine a type of a touch event. Then, the processor 708 provides a corresponding visual output on the display panel according to the type of the touch event. Although, in FIG. 7, the touch-sensitive surface and the display panel are used as two separate parts to implement input and output functions, in some embodiments, the touch-sensitive surface and the display panel may be integrated to implement the input and output functions.

The terminal may further include at least one sensor 705, such as an optical sensor, a motion sensor, and other sensors. Specifically, the optical sensor may include an ambient light sensor and a proximity sensor. The ambient light sensor can adjust luminance of the display panel according to brightness of the ambient light. The proximity sensor may switch off the display panel and/or backlight when the terminal is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal, are not further described herein.

The audio circuit 706, a speaker, and a microphone may provide audio interfaces between the user and the terminal. The audio circuit 706 may convert received audio data into an electric signal and transmit the electric signal to the speaker. The speaker converts the electric signal into a sound signal for output. On the other hand, the microphone converts a collected sound signal into an electric signal. The audio circuit 706 receives the electric signal and converts the electric signal into audio data, and outputs the audio data to the processor 708 for processing. Then, the processor 708 sends the audio data to, for example, another terminal by using the RF circuit 701, or outputs the audio data to the memory 702 for further processing. The audio circuit 706 may further include an earplug jack, so as to provide communication between a peripheral earphone and the terminal.

WiFi is a short distance wireless transmission technology. The terminal may help, by using the WiFi module 707, the user to receive and send e-mails, browse a web page, access streaming media, and so on, which provides wireless broadband Internet access for the user. Although FIG. 7 shows the WiFi module 707, it may be understood that the WiFi module is not a necessary component of the terminal, and when required, the WiFi module may be omitted as long as the scope of the essence of the present disclosure is not changed.

The processor 708 is the control center of the terminal, and is connected to various parts of a mobile phone by using various interfaces and lines. By running or executing the software program and/or module stored in the memory 702, and invoking data stored in the memory 702, the processor 708 performs various functions and data processing of the terminal, thereby performing overall monitoring on the mobile phone. In some embodiments, the processor 708 may include one or more processing cores. Preferably, the processor 708 may integrate an application processor and a modem. The application processor mainly processes an operating system, a user interface, an application program, and the like. The modem mainly processes wireless communication. It may be understood that the foregoing modem may also not be integrated into the processor 708.

The terminal further includes the power supply 709 (such as a battery) for supplying power to the components. Preferably, the power supply may be logically connected to the processor 708 by using a power management system, thereby implementing functions such as charging, discharging, and power consumption management by using the power management system. The power supply 709 may further include one or more of a direct current or alternating current power supply, a re-charging system, a power failure detection circuit, a power supply converter or inverter, a power supply state indicator, and any other components.

Although not shown in the figure, the terminal may further include a camera, a Bluetooth module, and the like, which are not further described herein. Specifically, in this embodiment, the processor 708 in the terminal may load executable files corresponding processes of the one or more application programs to the memory 702 according to the following instructions, and runs the application programs stored in the memory 702, so as to implement various functions: obtaining encoded video data, the encoded video data including a plurality of GOPs, a frame type of a first frame of an initial GOP in the plurality of GOPs being an I frame, frame types of first frames of the other GOPs being GF frames, and the GF frame being configured to record change information of a current frame relative to an I frame or a GF frame in a previous GOP; successively decoding the GOPs in the encoded video data, to obtain original video data; and outputting the original video data.

Reference may be made to the foregoing embodiments for specific implementations and beneficial effects of the foregoing operations, and details are not described herein again.

Accordingly, in this embodiment, the original video data may be encoded after being obtained, to generate a plurality of sequentially arranged GOPs; and subsequently, the plurality of GOPs are successively output according to the sequence, to obtain the encoded video data, where the frame type of the first frame of the initial GOP in the plurality of GOPs is an I frame, the frame types of the first frames of the other GOPs are GF frames, and the GF frame is configured to record the change information of the current frame relative to the I frame or the GF frame in the previous GOP. In this solution, the GF frame refers to the I frame or the GF frame in the previous GOP. Therefore, even when a frame in the GOP is lost, other frames in the GOP would not be affected. In addition, the size of the GF frame is smaller than that of the I frame, so that downloading and decoding of a subsequent GOP are quicker, and even the video data can be quickly downloaded under a low network speed, so as to smoothly present the video data. Therefore, with respect to an existing solution, this solution can significantly improve an packet-loss resistance, so as to avoid delayed play or frame freezing, thereby helping to improve a play effect.

A person of ordinary skill in the art may understand that all or a part of the steps of the methods in the foregoing embodiments may be implemented by a program instructing relevant hardware. The program may be stored in a computer readable storage medium. The storage medium may include: a read-only memory (ROM), a random-access memory (RAM), a magnetic disk, or an optical disc.

The video data encoding and decoding method, device, and system provided in the embodiments of the present disclosure are described in detail above. The principle and implementations of the present disclosure are described herein through specific examples. The description about the embodiments of the present disclosure is merely provided to help understand the method and core ideas of the present disclosure. In addition, a person skilled in the art can make variations and modifications to the present disclosure in terms of the specific implementations and application scopes according to the ideas of the present disclosure. Therefore, the content of the specification shall not be construed as a limit to the present disclosure.

What is claimed is:

1. A video data processing method, comprising:
obtaining video data;
generating a plurality of groups-of-pictures from the video data according to a sequence of generation time, wherein the plurality of groups-of-pictures includes a first group-of-pictures and a second group-of-pictures, the first group-of-pictures includes a first enhanced P (EP) frame, the second group-of-pictures includes a second EP frame, and the second EP frame in the second group-of-pictures is configured to search for the first EP frame in the first group-of-pictures as a reference in processing the video data;

upon determining it is the first time to encode pictures from the video data and that the plurality of groups-of-pictures includes an initial group-of-pictures and subsequent groups-of-pictures, encoding the initial picture group using an intra-frame prediction encoding algorithm and an inter-frame prediction encoding algorithm, wherein a first frame of the initial group-of-pictures is of an I frame, and other frames of the initial group-of-pictures include a P frame, a special P (SP) frame, or an enhanced P (EP) frame; and upon determining it is not the first time to obtain the pictures from the video data, encoding each of the subsequent groups-of-pictures using the inter-frame prediction encoding algorithm, wherein a first frame of the each of the subsequent groups-of-pictures is of a GF frame, and wherein other frames in the each of the subsequent groups-of-pictures are of the P frame, the SP frame, or the EP frame, and wherein:

the SP frame is configured to record change information relative to a previous frame, of the I frame, the GF frame, the P frame, or the SP frame, in a current group-of-pictures, the EP frame is configured to record change information relative to a previous frame, of the I frame, the GF frame, the P frame, the SP frame, or the EP frame, in a current group-of-pictures, and the GF frame is configured to record change information relative to a previous frame, of the I frame or the GF frame, in a previous group-of-pictures.

2. The method according to claim 1, further comprising:
adding a serial number to each of the plurality of groups-of-pictures according to the sequence of the generation time.

3. A video data processing method, comprising:
obtaining encoded video data, the encoded video data comprising a plurality of groups-of-pictures, wherein the plurality of groups-of-pictures includes a first group-of-pictures and a second group-of-pictures, the first group-of-pictures includes a first enhanced P (EP) frame, the second group-of-pictures includes a second EP frame, and the second EP frame in the second group-of-pictures is configured to search for the first EP frame in the first group-of-pictures as a reference in processing the video data, and wherein a frame type of a first frame of an initial group-of-pictures in the plurality of groups-of-pictures being an I frame, a frame type of each other frames of the initial group-of-pictures include a P frame, a special P (SP) frame, or an enhanced P (EP) frame, frame types of first frames of subsequent groups-of-pictures in the plurality of groups-of-pictures being GF frames, a frame type of each other frames of the subsequent groups-of-pictures being a P frame, a SP frame, or an EP frame;

successively decoding the plurality of groups-of-pictures in the encoded video data, to obtain original video data, comprising:

determining a frame that currently needs to be decoded and a corresponding frame type from a group-of-pictures that currently needs to be decoded;

upon determining a frame type of the frame that currently needs to be decoded is an I frame, decoding the frame that currently needs to be decoded by using an intra-frame prediction decoding algorithm;

upon determining the frame type of the frame that currently needs to be decoded is a GF frame, a P frame, a SP frame, or an EP frame, decoding the frame that currently needs to be decoded by using an inter-frame prediction decoding algorithm; and outputting the original video data.

4. The method according to claim 3, wherein upon determining the frame type of the frame that currently needs to be decoded is a GF frame, a P frame, a SP frame, or an EP frame, decoding the frame that currently needs to be decoded by using an inter-frame prediction decoding algorithm further comprises:

upon determining the frame type of the frame that currently needs to be decoded is a GF frame, using an I frame or a GF frame in a previous group-of-pictures as a reference;

upon determining the frame type of the frame that currently needs to be decoded is a P frame, using an adjacent previous frame of the frame that currently needs to be decoded as a reference;

upon determining the frame type of the frame that currently needs to be decoded is a special P frame, using an I frame, a GF frame, a P frame, or a special P frame previous to the frame that currently needs to be decoded in this group-of-pictures as a reference; and upon determining the frame type of the frame that currently needs to be decoded is an enhanced P frame, using an I frame, a GF frame, a special P frame, or an enhanced P frame previous to the frame that currently needs to be decoded in the group-of-pictures that currently needs to be decoded as a reference.

5. A video data processing apparatus, comprising: a memory; and a processor coupled to the memory, the processor being configured to perform:

obtaining video data;

generating a plurality of groups-of-pictures from the video data according to a sequence of generation time, wherein the plurality of groups-of-pictures includes a first group-of-pictures and a second group-of-pictures, the first group-of-pictures includes a first enhanced P (EP) frame, the second group-of-pictures includes a second EP frame, and the second EP frame in the second group-of-pictures is configured to search for the first EP frame in the first group-of-pictures as a reference in processing the video data;

upon determining it is the first time to encode pictures from the video data and that the plurality of groups-of-pictures includes an initial group-of-pictures and subsequent groups-of-pictures, encoding the initial picture group using an intra-frame prediction encoding algorithm and an inter-frame prediction encoding algorithm, wherein a first frame of the initial group-of-pictures is of an I frame, and other frames of the initial group-of-pictures include a P frame, a special P (SP) frame, or an enhanced P (EP) frame; and upon determining it is not the first time to obtain the pictures from the video data, encoding each of the subsequent groups-of-pictures using the inter-frame prediction encoding algorithm, wherein a first frame of the each of the subsequent groups-of-pictures is of a GF frame, and wherein other frames in the each of the subsequent groups-of-pictures are of the P frame, the SP frame, or the EP frame, and wherein:

the SP frame is configured to record change information relative to a previous frame, of the I frame, the GF frame, the P frame, or the SP frame, in a current group-of-pictures, the EP frame is configured to record change information relative to a previous frame, of the I frame, the GF frame, the P frame, the SP frame, or the EP frame, in a current group-of-pictures, and the GF frame is configured to record change information relative to a previous frame, of the I frame or the GF frame, in a previous group-of-pictures.

6. The apparatus according to claim 5, wherein the processor is further configured to perform:

adding a serial number to each of the plurality of groups-of-pictures according to the sequence of the generation time.

7. The method according to claim 1, wherein other frames in the each of the subsequent groups-of-pictures include the P frame, the SP frame, and the EP frame.

8. The method according to claim 3, wherein other frames in the each of the subsequent groups-of-pictures include the P frame, the SP frame, and the EP frame.

9. The apparatus according to claim 5, wherein other frames in the each of the subsequent groups-of-pictures include the P frame, the SP frame, and the EP frame.

10. The method according to claim 1, wherein the other frames of the initial group-of-pictures include the P frame, the SP frame, and the EP frame.

11. The method according to claim 3, wherein the other frames of the initial group-of-pictures include the P frame, the SP frame, and the EP frame.

12. The apparatus according to claim 5, wherein the other frames of the initial group-of-pictures include the P frame, the SP frame, and the EP frame.

* * * * *